US008976682B2

(12) United States Patent
Boutros et al.

(10) Patent No.: US 8,976,682 B2
(45) Date of Patent: Mar. 10, 2015

(54) CONNECTION VERIFICATION FOR MPLS LABEL SWITCHED PATHS AND PSEUDOWIRES

(71) Applicant: Cisco Technology, Inc., San Jose, CA (US)

(72) Inventors: Sami Boutros, San Ramon, CA (US); Muthurajah Sivabalan, Kanata (CA); David D. Ward, Los Gatos, CA (US); George Swallow, Boston, MA (US); Stewart Frederick Bryant, Surrey (GB); Ian Michael Charles Shand, Surrey (GB)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 13/760,854

(22) Filed: Feb. 6, 2013

(65) Prior Publication Data
US 2013/0148489 A1    Jun. 13, 2013

Related U.S. Application Data

(63) Continuation of application No. 12/383,360, filed on Mar. 23, 2009, now Pat. No. 8,374,095.

(51) Int. Cl.
*H04L 12/24* (2006.01)
*H04L 12/26* (2006.01)
*H04L 12/721* (2013.01)
(Continued)

(52) U.S. Cl.
CPC ........ *H04L 12/2419* (2013.01); *H04L 43/0811* (2013.01); *H04L 45/26* (2013.01); *H04L 45/28* (2013.01); *H04L 45/50* (2013.01); *H04L 47/10* (2013.01)

USPC ....................................... 370/241.1; 370/248

(58) Field of Classification Search
CPC ..... H04L 41/00; H04L 43/0811; H04L 43/10; H04L 45/22; H04L 43/50; H04L 45/50; H04L 12/2419; H04L 45/28; H04L 47/10; H04L 45/26
USPC ......... 370/216, 217, 218, 241, 248, 249, 250, 370/251, 241.1, 351, 389, 395.1, 395.5
See application file for complete search history.

(56) References Cited

U.S. PATENT DOCUMENTS 6,965,572 B1 * 11/2005 Boodaghians ................ 370/249
7,343,423 B2    3/2008 Goguen et al.
(Continued)

FOREIGN PATENT DOCUMENTS

EP    2079189 A1 *  7/2009

*Primary Examiner* — Obaidul Huq
(74) *Attorney, Agent, or Firm* — Novak Druce Connolly Bove + Quigg LLP

(57) ABSTRACT

In one embodiment, a maintenance intermediate point (MIP) receives a packet traveling along a multi-protocol label switching (MPLS) label switched path (LSP) that extends from a first maintenance end point (MEP) to a second MEP. The receiving MIP decrements a time-to-live (TTL) value in a header of the packet. In response the TTL value in the header of the packet equaling a particular value, the receiving MIP examines an associated channel header (ACH) field in an operations, administration, and maintenance (OAM) message stored in a payload of the packet, and determines a particular OAM function to perform based on a code in the ACH field. The receiving MIP performs the particular OAM function.

20 Claims, 6 Drawing Sheets

(51) Int. Cl.
*H04L 12/703* (2013.01)
*H04L 12/723* (2013.01)
*H04L 12/801* (2013.01)

(56) References Cited

U.S. PATENT DOCUMENTS

| | | |
|---|---|---|
| 7,408,941 B2 | 8/2008 | Martini et al. |
| 7,463,591 B1 | 12/2008 | Kompella et al. |
| 7,483,387 B2 | 1/2009 | Guichard et al. |
| 7,583,665 B1 | 9/2009 | Duncan et al. |
| 2004/0052257 A1 | 3/2004 | Abdo et al. |
| 2005/0044262 A1 | 2/2005 | Luo |
| 2005/0097219 A1 | 5/2005 | Goguen et al. |
| 2005/0180422 A1 | 8/2005 | Boodaghians |
| 2006/0045028 A1 | 3/2006 | Hasan et al. |
| 2006/0047851 A1 | 3/2006 | Voit et al. |
| 2006/0146832 A1 | 7/2006 | Rampal et al. |
| 2006/0165089 A1* | 7/2006 | Klink ................. 370/395.5 |
| 2006/0198321 A1 | 9/2006 | Nadeau et al. |
| 2006/0215548 A1 | 9/2006 | Le Faucheur et al. |
| 2006/0245436 A1 | 11/2006 | Sajassi |
| 2007/0008982 A1 | 1/2007 | Voit et al. |
| 2007/0025241 A1* | 2/2007 | Nadeau et al. ........... 370/229 |
| 2007/0115840 A1 | 5/2007 | Feick et al. |
| 2007/0133398 A1 | 6/2007 | Zhai |
| 2007/0140126 A1* | 6/2007 | Osswald et al. ........ 370/236.2 |
| 2008/0008178 A1 | 1/2008 | Tychon et al. |
| 2008/0037526 A1 | 2/2008 | Dong |
| 2008/0219172 A1* | 9/2008 | Mohan et al. ........... 370/241.1 |
| 2008/0279110 A1 | 11/2008 | Hart et al. |

* cited by examiner

CONNECTION VERIFICATION FOR MPLS LABEL SWITCHED PATHS AND PSEUDOWIRES

RELATED APPLICATIONS

The present application is a continuation of U.S. patent application Ser. No. 12/383,360 entitled "Connection Verification for MPLS Label Switched Paths and Pseudowires", field on Mar. 23, 2009 by Boutros et al., the contents of which are incorporated herein by reference in their entirety.

TECHNICAL FIELD

The present disclosure relates generally to computer networks, and, more particularly, to Multi-Protocol Label Switching (MPLS) technology.

BACKGROUND

MPLS Operations, Administration, and Maintenance (OAM) is based on instantiated Maintenance Points (e.g., most often by configuration). Maintenance points are called Maintenance End Points (MEPs) or Maintenance Intermediate Points (MIPs) depending whether they are located at the end or in the middle of an MPLS Label Switched Path (LSP), respectively. OAM operations occur based on the exchange of packets between these points. The sole means of reaching a particular MIP via the data-plane is to properly set a time-to-live (TTL) value in an OAM message such that the packet expires at that particular desired MIP. Thus TTL values must be specifically known and configured. There are two drawbacks to this approach, however. First, it is prone to errors, such as due to manual misconfiguration. Second, it is static, and it does not respond to changing hop distances within the network to a particular MIP. This in turn places certain restrictions on the types of LSP repair that can be performed. Namely, MIP to TTL mappings cannot vary, thus the means of providing reroute are limited to those which preserve the number of hops in the LSP.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a connection verification (CV) message may be initiated from an initiating maintenance end point (MEP) for a multi-protocol label switching (MPLS) label switched path (LSP), where the CV message is carried in a packet having a time-to-live (TTL) value of 1. Each maintenance intermediate point (MIP) along the MPLS LSP that receives the packet may decrement the TTL, and in response to determining that the TTL equals 0, may examine a payload of the packet to determine that the packet carries the CV message. If so, the MIP may append its MIP identification (ID) to a route record field of the payload having any previous MIP IDs of upstream MIPs, and forwards the CV message downstream along the MPLS LSP in a packet having a TTL value of 1 (e.g., to a next MIP of an end MEP). The end MEP eventually receives the CV message, and sends a CV reply having the route record field with MIP IDs of the MPLS LSP and an end MEP ID of the MPLS LSP to the initiating MEP.

Also, according to one or more embodiments of the disclosure, a MIP may generally receive a packet along an MPLS LSP, decrement a TTL value in the packet, and determine that the TTL equals 0. In response, the MIP may examine an associated channel header (ACH) field in a payload of the packet to determine a particular operations, administration, and maintenance (OAM) function to perform based on a code in the ACH field. Accordingly, the MIP may perform the particular OAM function.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
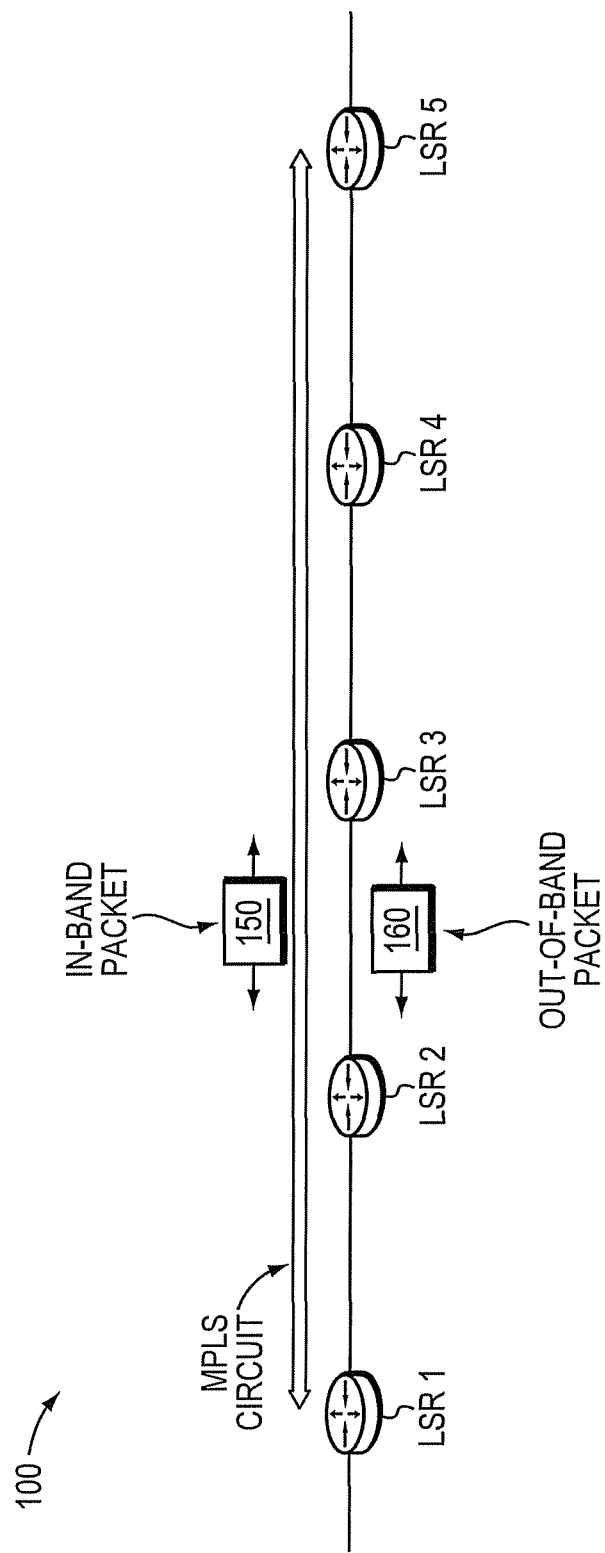
FIG. 1 illustrates an example computer network.

FIG. 1 is a schematic block diagram of an example computer network 100 illustratively comprising nodes/devices, such as one or more link state routers (LSRs) 1-5 interconnected by links as shown. Illustratively, the network 100 is embodied as a multiprotocol label switching (MPLS) network, where the LSRs communicate using labels prepended to packets in a manner that establishes MPLS "circuits" through the network. Packets sent through the circuit are considered "in-band" packets 150, while packets not sent through the circuit (e.g., using other protocols where available, such as the Internet Protocol (IP), User Datagram Protocol (UDP), etc.) are considered "out-of-band" packets 160. Illustratively, as used herein, an MPLS "circuit" may generally refer to an MPLS label switched path (LSP), but may also refer to an MPLS pseudowire (PW), as described below and as will be understood by those skilled in the art. Those skilled in the art will also understand that any number of nodes, devices, links, etc. may be used in the computer network, and that the view shown herein is for simplicity.

Figure 2:
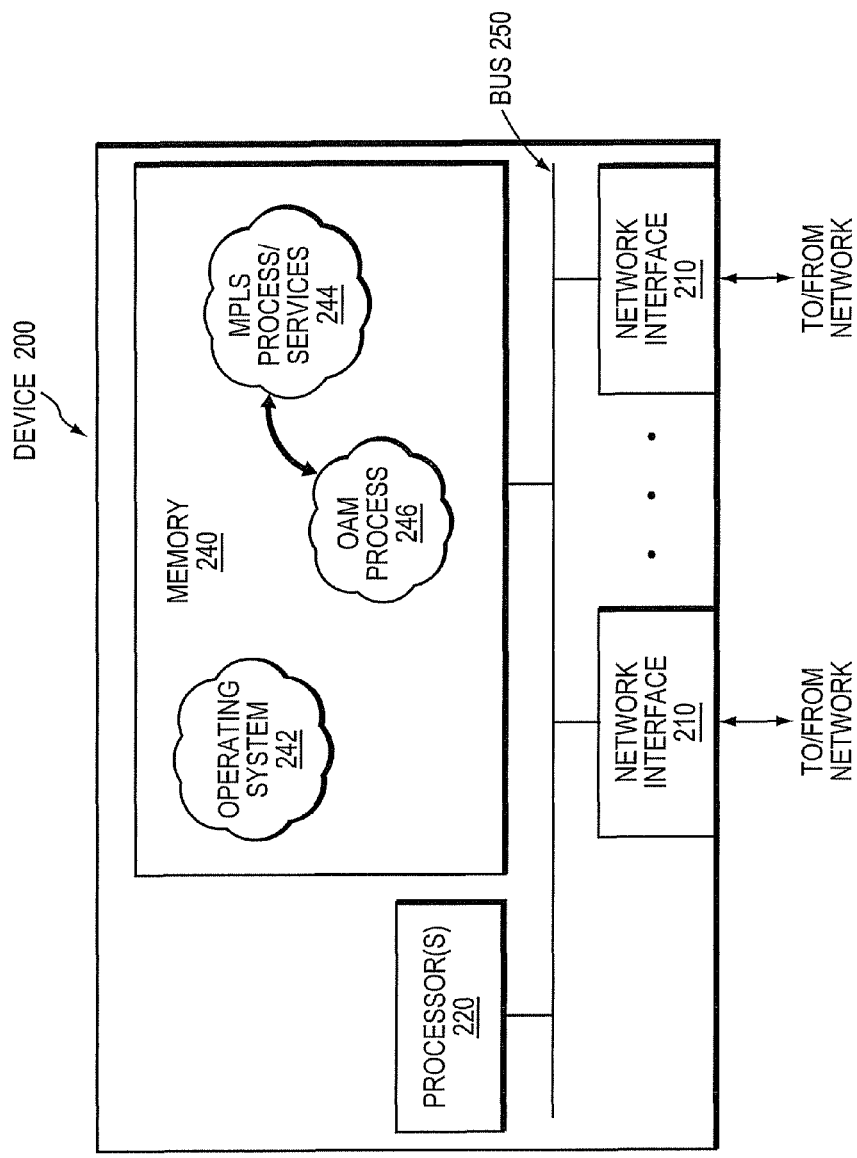
FIG. 2 illustrates an example network device.

FIG. 2 is a schematic block diagram of an example node/device 200 that may be advantageously used with one or more embodiments described herein, e.g., as an LSR. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, MPLS, IP, UDP, etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic configured to execute the software programs and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an MPLS process 244 and an operations, administration, and maintenance (OAM) process 246. It will be apparent to those skilled in the art that other types of processors and memory, including various computer-readable media, may be used to store and execute program instructions pertaining to the inventive technique described herein. In addition, while the processes are shown within general memory 240, those skilled in the art will appreciate that the processes may be contained as a component within network interfaces 210 (e.g., in an ASIC of the network interface, accordingly).

MPLS process/services 244 contain computer executable instructions executed by processor 220 to perform functions provided by the MPLS protocol, such as for MPLS LSP communication, as will be understood by those skilled in the art. These functions may be configured to manage a forwarding information database (not shown) containing, e.g., data used to make forwarding decisions. In particular, MPLS is generally considered a "tunneling protocol," where circuits are created between a head-end LSR and a tail-end LSR, traversing one or more intermediate LSRs (e.g., from LSR 1 to LSR 5 via LSRs 2-4). Each LSR allocates a label for the MPLS circuit, and informs its upstream neighbor to use the allocated label to forward traffic on the circuit (in addition to a transport label for the upstream neighbor to reach the LSR). Upon receiving traffic with the allocated label, the LSR determines the corresponding MPLS circuit, and pushes a label expected/allocated by its downstream neighbor. Those skilled in the art will also appreciate that MPLS circuits may be multi-layered or "nested," such that a circuit/tunnel hierarchy is formed where one or more tunnels may be carried via other tunnels.

MPLS Transport Profile (MPLS-TP) networks are currently being deployed by service providers to emulate traditional circuits (e.g., ATM/SONET/etc.) with MPLS circuits (LSPs or PWs). When MPLS is used as a transport network, the MPLS circuits are generally bi-directional, or at least comprise two uni-directional circuits that must terminate at the same end points. As noted above, MPLS-TP OAM is based on instantiated Maintenance Points (e.g., most often by configuration). Maintenance points (e.g., LSRs) are called Maintenance End Points (MEPs) or Maintenance Intermediate Points (MIPs) depending whether they are located at the end (head-end LSR or tail-end LSR) or in the middle of an MPLS LSP, respectively. OAM operations occur based on the exchange of packets between these points.

Generally, the sole means of reaching a particular MIP via the data-plane is to properly set a time-to-live (TTL) value in an OAM message such that the packet expires at that particular desired MIP. Thus TTL values must be specifically known and configured. As mentioned, there are two drawbacks to this approach, however. First, it is prone to errors, such as due to manual misconfiguration. Second, it is static, and it does not respond to changing hop distances within the network to a particular MIP. This in turn places certain restrictions on the types of LSP repair that can be performed. Namely, MIP to TTL mappings cannot vary, thus the means of providing reroute are limited to those which preserve the number of hops in the LSP.

Consider the example above of LSRs 1-5 above, and a bi-directional MPLS LSP that is created traversing them. Thus the MPLS LSP spans LSR 1, LSR 2, LSR 3, LSR 4, and LSR 5, where LSR 1 and LSR 5 are ingress and egress LSRs for the respective direction. Accordingly, LSR 1 and LSR 5 may act as MEPs, while LSR 2, LSR 3, and LSR 4 are MIPs. Assume that the OAM objective is to verify (both in control and data planes) the MPLS-TP LSP end-to-end from LSR 1 to LSR 5, and to record all the LSRs along the path. Those skilled in the art will appreciate that this could be accomplished using a conventional "traceroute" operation in which LSR 1 interrogates each LSR 2-5 in turn using a sequentially increased TTL values in each new message to generate a response from each subsequent LSR, and then compiles the result. According to the simplified example network 100 of FIG. 1, this process would require eight messages—i.e., a request and a response between LSR 1 and each of the other LSRs 2-5. For extended MPLS LSPs, this traceroute operation may generate excessive traffic on the LSP, and require extended processing by the initiating MEP (e.g., LSR 1).

In addition, when an MPLS-TP circuit or multi-segment pseudowire (MS-PW) is provisioned, it is necessary that correct and consistent identifiers be configured at the endpoints (MEPs) and intermediate nodes (MIPs) along the path. Further the mechanisms used to reach particular nodes along a path require precise knowledge of the TTL values necessary to deliver OAM packets to the MIP/MEP entities in those nodes (MIP/MEP to TTL mappings). Thus mechanisms are necessary to either verify or discover the proper binding between the identifiers for the path, the identifiers for the MIPs and MEPs and the TTL values required to cause an OAM packet to be received at a chosen MIP or MEP.

Further, when applied in a general MPLS environment, dynamic events such as MPLS Traffic Engineering (MPLS-TE) Fast Re-route (FRR) can cause the above described TTL values to change. Upon such an event, any such changes must be discovered to ensure proper continuing operation.

The invention described herein is a set of mechanisms that verifies the label values at each hop along an MPLS LSP are properly bound to the correct LSP, and also verifies (or alternatively discovers) the MIP/MEP IDs and the TTL values necessary to reach the identified MIPs and MEPs.

In particular, according to one or more embodiments of the disclosure, therefore, a novel connection verification (CV) message may be initiated from an initiating MEP for an MPLS LSP, where the CV message is carried in a packet having a TTL value of 1. Each MIP along the MPLS LSP that receives the packet may decrement the TTL, and in response to determining that the TTL equals 0 (i.e., has expired), may examine a payload of the packet to determine that the packet carries the CV message. If so, the MIP may append its MIP identification (ID) to a route record field of the payload having any previous MIP IDs of upstream MIPs, and forwards the CV message downstream along the MPLS LSP in a packet having a TTL value of 1 (e.g., to a next MIP of an end MEP). The end MEP eventually receives the CV message, and sends a CV reply having the route record field with MIP IDs of the MPLS LSP and an end MEP ID of the MPLS LSP to the initiating MEP. (Note that this accelerated CV mechanism would achieve the MIP to TTL mapping of the LSP in FIG. 1 in five messages, as opposed to eight as in a conventional traceroute operation described above.)

Illustratively, the techniques described herein may be performed by hardware, software, and/or firmware, such as in accordance with MPLS process 244 and particularly Operation, Administration, and Maintenance (OAM) process 246, which may contain computer executable instructions executed by the processor 220 to perform functions relating to the novel techniques described herein to provide a fast and efficient way to verify that an MPLS-TP LSP is properly setup in both control and data planes, as well as to record the identities of all the LSRs along all the path of MPLS-TP LSP. For example, MPLS process 244 and/or OAM process 246 may be embodied as a maintenance point process, such as particularly a MIP process or MEP process, depending upon which device is performing the desired functionality, accordingly.

In particular, the novel connection verification operation is faster and more efficient than a conventional traceroute (e.g., fewer messages and less processing), and also offers greater control over the content of exchanged messages as described herein (e.g., beyond merely generating error messages in response to expired sequential TTL values). Also, the connection verification operation is particularly useful with regard to MPLS-TP networks where there is no control plane, and the only manner to address a particular LSR in the network is to use a corresponding TTL representative of a hop count/distance from an initiating MEP (e.g., referred to as a TTL to MIP mapping). By changing the conventionally opaque payloads in MPLS to include an "ACH" field with OAM codes, which is inspected upon TTL expiration to define an action to perform, it is possible to define the connection verification operation according to one or more embodiments herein to verify that the state of the network is actually what is expected, or to discover the state of the network initially or due to changes in the network (e.g., certain networks are static, some are dynamic, and some have both static and dynamic portions).

Figure 3:
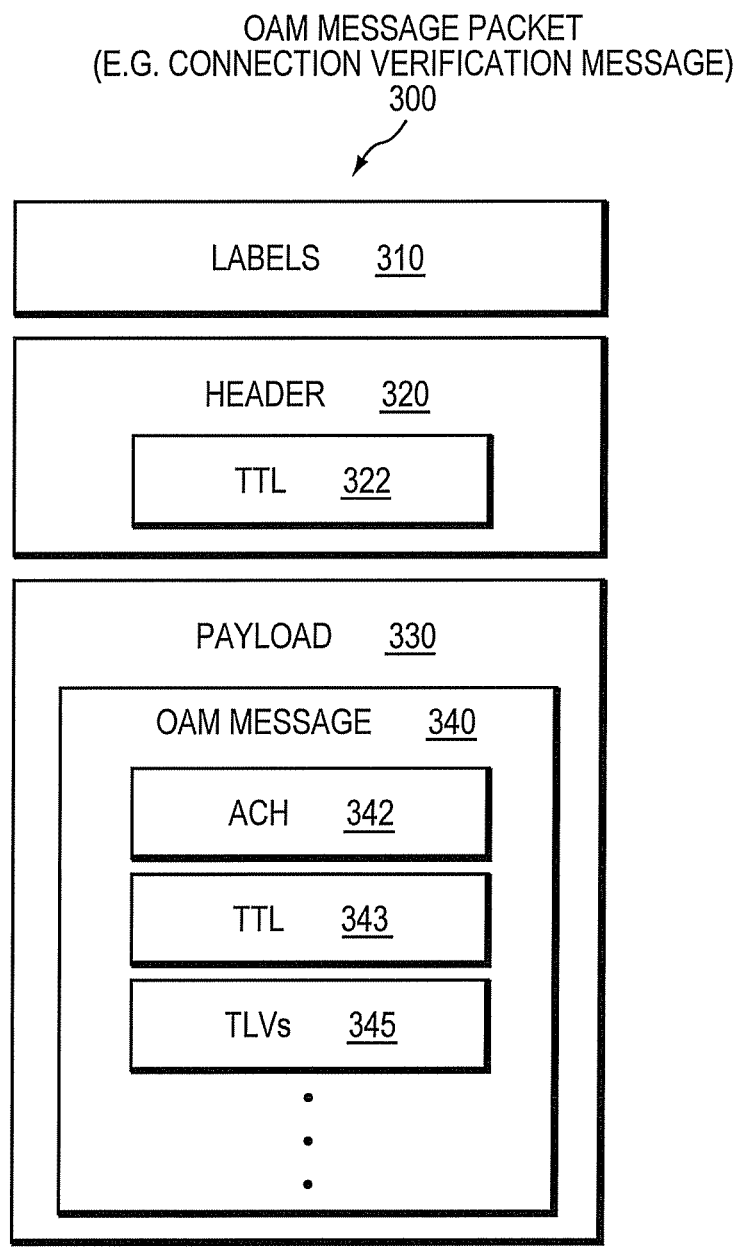
FIG. 3 illustrates an example packet/message.

Operationally, to describe the connection verification functionality, assume a bidirectional MPLS LSP (e.g., or a pseudowire, as mentioned below) with a connection ID "LSP 1" as shown in FIG. 1 from LSR 1 to LSR 5 via LSRs 2-4 (where LSRs 1-5 are MPLS capable nodes). Furthermore, assume that LSR 1 wants to verify connectivity of the MPLS LSP to LSR 5. In this example, LSR 1 and LSR 5 act as Maintenance End Points (MEPs) and LSR 2-4 act as Maintenance Intermediate Points (MIPs). Further, FIG. 3 illustrates an example (and simplified) OAM message packet 300. In particular, packet 300 may comprise one or more conventional headers (depending upon the transport protocol utilized and other factors), such as labels 310, a packet header 320 with a TTL value field 322, and a payload 330. Payload 330 may illustratively comprise the OAM message 340, an associated channel header (ACH) field 342, an inner TTL field (described below), and one or more TLVs (type/length/value objects) 345. In particular, the ACH field 342 may be used to carry "type" and "operation" codes (e.g., "type/op" codes), generally for in-band messages, such as in accordance with the techniques described herein. For example, the ACH field may define types comprising a connection verification request/response, acknowledgements, etc., and may have one of several different operations corresponding to the type. Alternatively, or in addition, TLVs may carry desired information, such as a Route Record TLV, a Connection ID TLV, a Sequence Number TLV, an Authentication TLV, a Source Identifier TLV (not needed in IP MPLS-OAM message version), a Target Identifier TLV (needed to verify that the OAM message is meant for this node), and a Response TLV.

According to one or more embodiments described herein, an MPLS OAM connection verification (CV) message may be originated at a MEP and may be intercepted by each MIP along the path of the MPLS LSP as well as the other end MEP. That is, the proposed mechanism addresses the verification of the full path of an MPLS-TP LSP. An MPLS-OAM CV message is intercepted at a MIP based on MPLS TTL expiry at that MIP, and at the end MEP because it is the end of the LSP (i.e., regardless of the value of the TTL).

For example, after an MPLS LSP is provisioned ("LSP 1") at LSRs 1-5 with the same connection-ID, LSR 1 may send an MPLS-OAM CV Request message along the path of the LSP. In other words, an initiating MEP (e.g., LSR 1) may initiate a CV message 300 for the LSP, where the CV message contains a connection ID for the LSP in question, a record route field (a TLV 345) for carrying LSR IDs, and a sequence number to correlate a given reply with the request. In response to the CV request, each LSR along the path of the MPLS LSP may verify that the connection ID is associated with a topmost label value on a label stack 310 received in the OAM packet 300 as well as an outbound label recorded by a previous node (MIP or initiating MEP), if this information is provided in the received request. If this information is correct, then the MIP (or end MEP) may either verify or records/appends its ID as requested using the Record Route TLV, which may illustratively comprise LSR addresses, and optionally local labels allocated by the LSR for both directions of the MPLS-TP LSP. (Note that the CV message packet 300 may be an in-band MPLS OAM message forwarded as an MPLS packet (non-IP based) or an LSP-Ping message forwarded as an IP/UDP packet (IP based).

In order to be processed by each MIP along an LSP, the CV message may be carried in a packet having an initial TTL value 322 of 1, thus causing the first LSR (e.g., LSR 2) to intercept the message due to TTL expiry. Specifically, when receiving the packet 300 at a MIP along the MPLS LSP, that MIP may decrement the TTL (e.g., to 0), and in response to determining that the TTL equals 0 (i.e., has expired), may examine a payload 330 of the packet to determine that the packet carries the CV message 340 (e.g., a specific type of OAM message based on a code in the ACH field 342).

In response to a CV request, the receiving MIP (e.g., LSR 2) may verify the request and confirm that the CV message is for a proper LSP (e.g., if the connection-ID matches that in the message), that the MPLS LSP is setup in the control and data planes, and that the label value is correctly bound to the identified LSP (e.g., verifying that the control plane and data plane are in sync). If so, the receiving MIP may append its MIP ID (e.g., an address) to the message in the route record TLV, and forward the CV message to a next LSR (e.g., LSR 3) with a TTL value 322 of 1 (such that the next LSR will also expire the TTL and examine the payload, accordingly). (Note that where a control plane is not available at the MIPs, at each receiving MIP the verification is performed with respect to the information that has been configured by, e.g., the management plane.)

Figure 4:
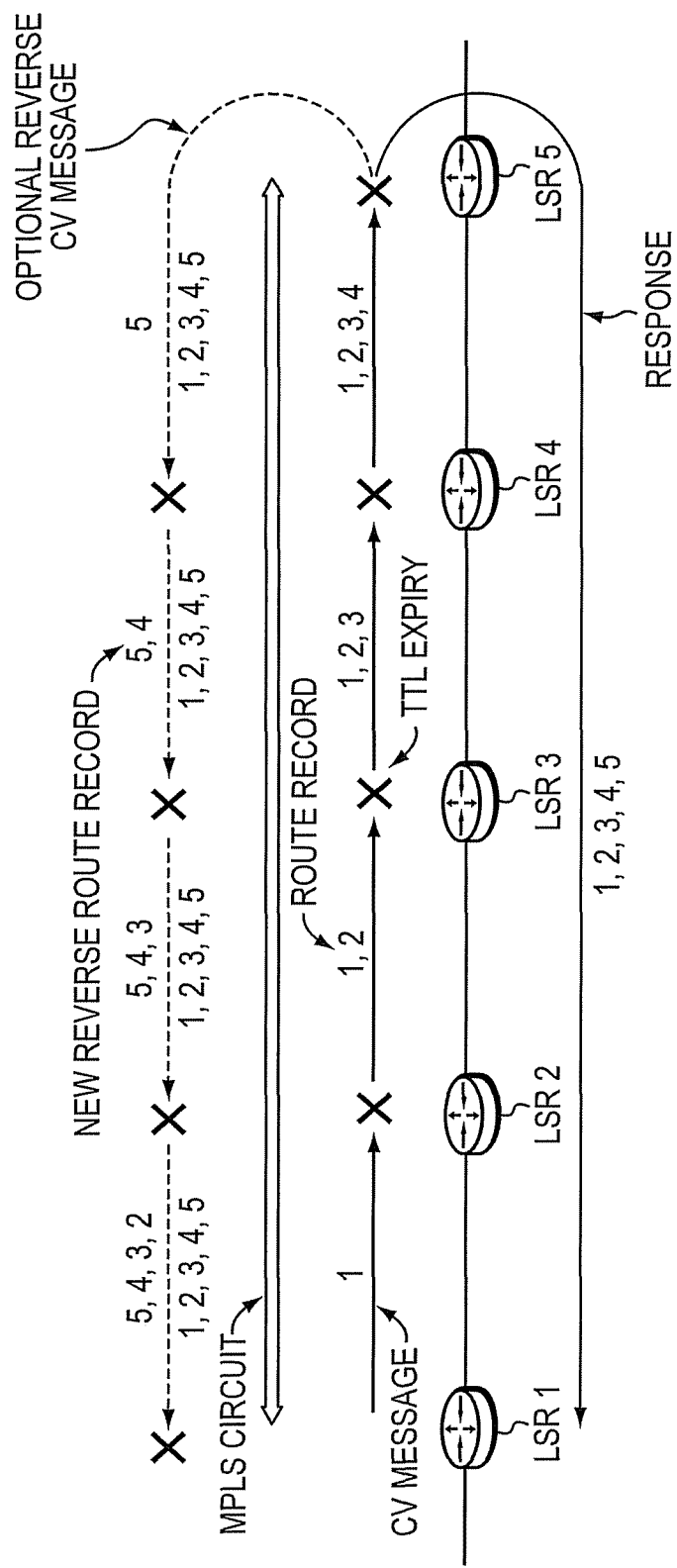
FIG. 4 illustrates an example network showing connection verification on an MPLS LSP.

The messages thus progresses towards the end MEP (e.g., LSR 5) with each LSR adding its own identity to the route record field (having any previous MIP IDs of upstream MIPs), and forwarding the CV message downstream along the MPLS LSP in a packet having a TTL value of 1, thus recording the set of LSRs along the path. FIG. 4 illustrates an example CV message propagation through the illustrative network 100, showing a representation of the route record field of each forwarded CV message (having a TTL of 1).

The CV message may eventually be received at the end MEP (e.g., LSR 5), where the TTL value also expires, however the end MEP also notes that the message is addressed to it (as the end MEP of the LSP) and thus it knows that the message requires further processing. As such, the end MEP (e.g., LSR 5) may verify the request, and if the connection-ID of the LSP matches that in the message, and the LSP is setup in both control and data planes, the end MEP may send an MPLS-OAM CV Reply message back to initiating MEP (e.g., LSR 1). The message now includes the address/ID of the end MEP (LSR 5) as well as all the addresses/IDs in the MPLS-OAM CV Request message of the MIPs along the LSP (e.g., LSRs 2-4). (Note that in the example, the initiating MEP included its ID in the route record field, which is not necessary and is merely one illustrative embodiment.) In particular, the end MEP may construct a response containing the route record and may send it back along the bidirectional path addressed to the initiating MEP (e.g., LSR 1) with a TTL that is sufficient to ensure that the message reaches the initiating MEP without further interception. When the response sent with a large TTL is received at the initiating MEP (e.g., LSR 1), then the initiating MEP now has the identity of each LSR (MIPs and end MEP) on the path and the TTL value (corresponding to hop distance) that it may use in the future to specifically address that LSR for OAM purposes.

As an optional alternative (shown as a dashed line in FIG. 4), the end MEP (e.g., LSR 5) may send the reply down the return path (in-band on a bi-directional MPLS LSP) again with a TTL value of 1 with an instruction that the LSRs are to verify the label bindings in the reverse direction and that the path is symmetric. For instance, this may be verified either by inspection, or by recording their address within the route record in reverse. According to the latter case, when a response is sent with a TTL value of 1, the response will eventually reach the initiating MEP (e.g., LSR 1), and in addition to learning the path list as above, the initiating MEP may confirm that the path is bi-directionally symmetric, which is a critical consideration in transport networks.

Notably, according to one or more embodiments herein, if it is desired to only perform a partial path trace, the partial path trace may be conducted by setting the TTL value 322 of the OAM message such that the first intercepting LSR receives the message with TTL value of 1. Thus to first address LSR 3, LSR 1 would send the message with a TTL value of 2. In other words, the initiating MEP may send the CV message with a TTL value of 1 to a desired MIP along the MPLS LSP other than an adjacent MIP (e.g., LSR 2) to the initiating MEP. In particular, the TTL value may be set to expire at the desired MIP, and then the desired MIP (e.g., LSR 3) may forward the CV message downstream along the MPLS LSP in a packet having a TTL value of 1 to continue the processed propagation of the CV message hop-by-hop as described above.

Furthermore, the initiating MEP may include an instruction to limit the length of the path traced, such as by including an instruction indicating the end of the path of interest. For instance, the instruction may either be a specific MIP name or number of hops to record (e.g., a distinct payload TTL value 343, which is decremented at each MIP/MEP processing the OAM message, such that the final destination of the OAM message is set through a TTL value other than the header TTL value 322 for partial OAM message propagation). Thus, when the final LSR performing the CV operation processes the OAM message it may either send the request direct to the final LSR by using a suitably high TTL value (for example, LSR 2 would use a value of at least 2 to reach end MEP LSR 5), or may return a response directly to the initiating MEP if configured and able to do so (e.g., out-of-band).

One issue of concern is what happens if an LSP is misconfigured such that a loop arises. This would occur, for example, if LSR 4 had an adjacency to LSR 2 and LSR 4 was misconfigured to set the LSP next hop to LSR 2 instead of LSR 5 (such mistakes are easily made on a manually configured system). The embodiments herein describe three ways that this may be resolved. One is to use the TTL value in the payload itself (343)—which is decremented at each hop (note that this must be in the packet payload as the real TTL is being used to address the packet to a MIP via TTL expiry). Another way is to scan the addresses of the previous upstream MIP IDs to see if this LSR has already processed the packet (i.e., determining whether the CV message has looped). Notably, in the event the CV message is being used for bi-directional verification as described above, each received MIP's ID can appear once previously (i.e., in the first direction), but not twice. Finally, the packet should self limit when the MTU is reached (maximum transmission unit, e.g., the maximum size of the packet is breached due to all of the entries). In any solution, the packet may be dropped, and/or an error message may be sent to the initiating MEP (if configured and able to do so).

In addition, if a MIP does not understand the received message type (e.g., a CV message), then it may silently drop the packet. To discover this condition, however, and to also trap the looping condition, the initiating MEP (e.g., LSR 1) may set a timer when it sends the OAM/CV message. If the timer expires before the initiating MEP has received a response, then it knows that one of three conditions has occurred: either the LSP is incomplete/failed, a MIP did not understand this operation, or there is a loop. The initiating MEP may then investigate the situation by performing a classic one hop at a time, direct response traceroute.

In accordance with one or more additional embodiments described herein, the CV message may be initiated in response to a switchover event along the MPLS LSP. In particular, upon detecting a failure of an adjacent LSR or otherwise detecting a switchover event (e.g., due to out-of-policy conditions, such as based on performance measurement), a switchover (detecting) MIP may transmit a bi-directional alarm to the initiating MEP and the end MEP of the MPLS LSP, respectively. In other words, a MIP may transmit fault messages downstream and upstream, and then the initiating MEP may send a CV message in response to determine the newly grafted LSP (e.g., to discover a backup path, new MIP to TTL mappings, etc.).

Figure 5:
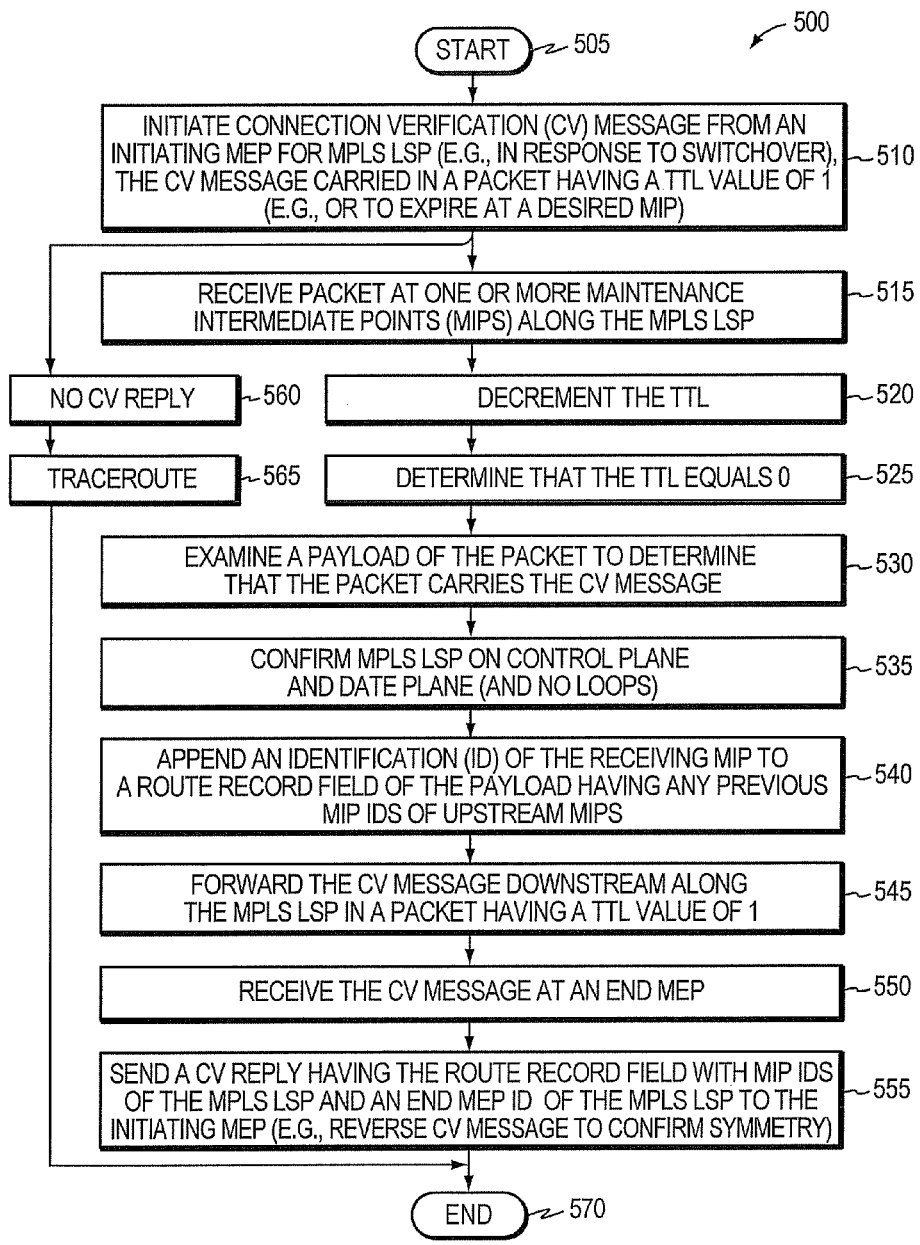
FIG. 5 illustrates an example procedure for connection verification on an MPLS LSP.

FIG. 5 illustrates an example procedure for connection verification for MPLS LSPs in accordance with one or more embodiments described herein. The procedure 500 starts at step 505, and continues to step 510, where a CV message 300 is initiated from an initiating MEP (e.g., LSR 1) for an MPLS LSP, the CV message carried in a packet 150 having a TTL value 332 set to expire at a desired MIP (e.g., 1 for all MIPs, or some other number for a specific downstream MIP). As mentioned above, the CV message may be in response to a user command, a dynamic process, or in response to switchover event, as well as in response to expiration of a timer (e.g., periodically), accordingly.

Each MIP along the MPLS LSP may receive the packet in step 515, and decrements the TTL in step 520 to determine that the TTL equals 0 in step 525 (where other skipped MIPs not having an expired TTL simply propagate the packet). In response the expired TTL, the receiving MIP examines the payload 330 of the packet to determine that the packet carries the CV message (e.g., based on ACH 342). Upon confirming in step 535 that the MPLS LSP is operational on the control plane and date plane, that the label value is correctly bound to the identified LSP, and that there have been no loops to this point of the CV message (as described above), then the receiving MIP may append an its MIP ID to the route record field (a TLV 345) of the payload, which has any previous MIP IDs of upstream MIPs, accordingly.

The CV message is forwarded downstream along the MPLS LSP in this manner in step 545 (each hop having a TTL value of 1 to decrement) until the CV message is received at the end MEP in step 550. The end MEP (also decrementing the TTL value, but knowing it is the recipient of the message as an end MEP) send a CV reply message in step 555 having the route record field with MIP IDs of the MPLS LSP and an end MEP ID of the MPLS LSP to the initiating MEP, and the procedure 500 ends in step 570 (where the initiating MEP may process the reply, accordingly). In one or more embodiments as described above, the CV reply may be a reverse CV message to confirm symmetry of the MPLS LSP, or simply a returned message directly to the initiating MEP. Moreover, as mentioned above, if in step 560 there has been no CV reply received at the initiating MEP (e.g., due to failure of the MPLS LSP), then in step 565 the initiating MEP may perform a conventional traceroute operation to diagnose the problem.

Notably, while the description above pertains specifically to CV messages, other OAM messages 300 may also advantageously utilize the techniques described herein in a more general sense, particularly where the MIP to TTL mapping is up to date and the OAM functions may be requested of MIPs accurately. In particular, according to one or more embodiments of the disclosure, a MIP may generally receive a packet along an MPLS LSP, decrement a TTL value in the packet, and determine that the TTL equals 0, as described above. In response, the MIP may examine the ACH field 342 in a payload of the packet to determine a particular OAM function to perform based on a code in the ACH field. For example, in addition to the code signifying a CV message, other codes may be used to request, inter alia, a performance measurement, entering a loopback mode, and locking the MPLS LSP. Accordingly, the MIP may then perform the particular OAM function, assuming, that is, that the MIP is configured to process the OAM request.

Figure 6:
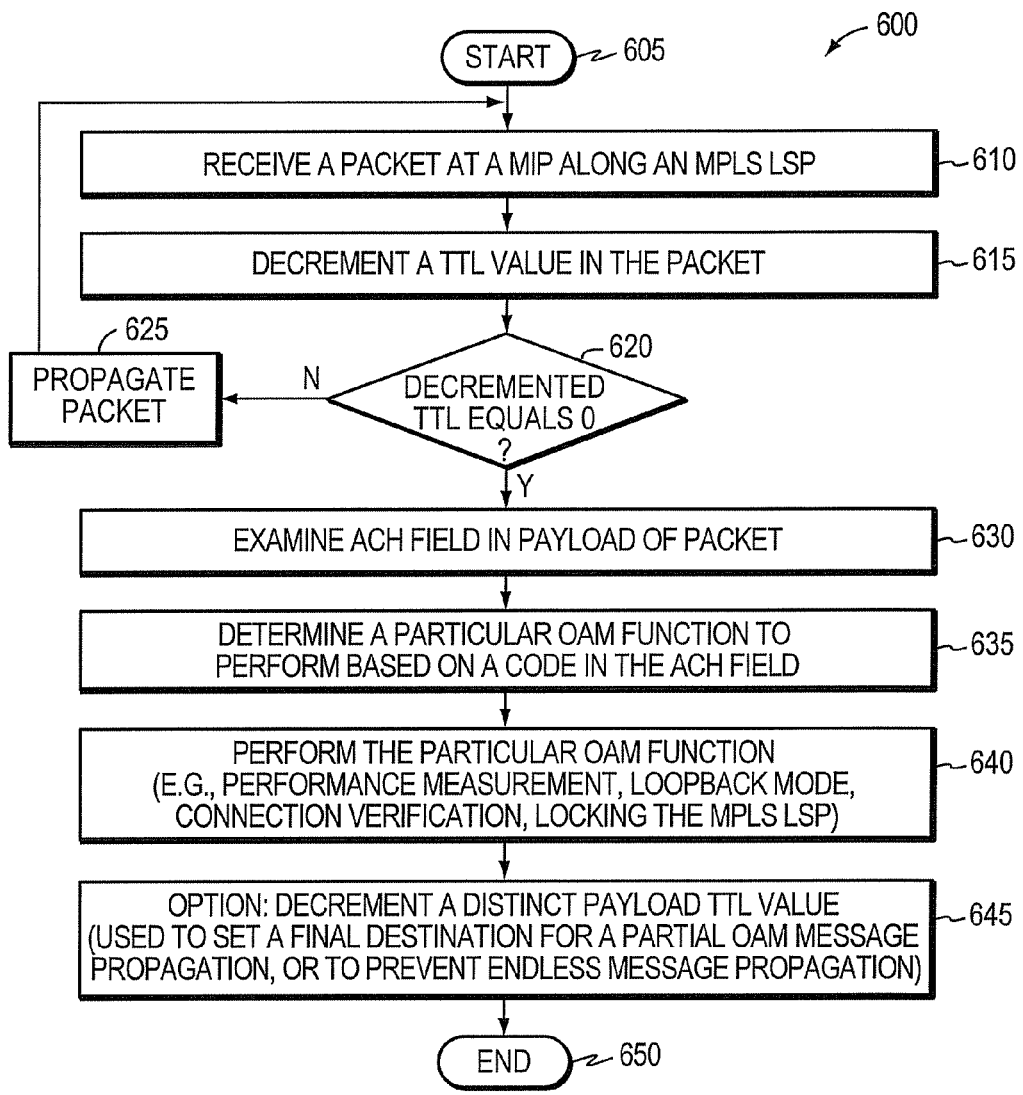
FIG. 6 illustrates an example procedure for OAM message passing/handling.

Briefly, FIG. 6 illustrates an example procedure for general OAM message passing on an MPLS LSP in accordance with one or more embodiments described herein. The procedure 600 starts at step 605, and continues to step 610, where a MIP along an MPLS LSP receives a packet, and then in step 615 decrements the TTL value in the packet. If the decremented TTL does not equal 0 (i.e., has not expired) in step 620, then the MIP simply propagates the packet downstream in a conventional manner in step 625. Conversely, if the TTL has expired in step 620, then in step 630 the receiving MIP examines the ACH field in the payload of the packet, and in step 635 determines a particular OAM function to perform based on a code in the ACH field, as mentioned above. Accordingly, in step 640, the receiving MIP may correspondingly perform the particular OAM function (e.g., performance measurement, loopback mode, connection verification, locking the MPLS LSP, etc.). Optionally, for use with both the CV message as described above and for general OAM messages, in step 645 the receiving MIP (having inspected the packet's payload) may decrement a distinct payload TTL value included within the OAM message. For instance, as mentioned above, the distinct payload TTL may be used to set a final destination for a partial OAM message propagation, or to prevent endless message propagation. The procedure 600 ends in step 650.

Advantageously, the novel techniques described herein provide for connection verification for MPLS LSPs in a computer network. In particular, the novel techniques discover and/or verify the label to Connection ID binding and the MIP to TTL mappings along with the identities of those MIPs as well as the MEPs of an LSP. Specifically, the mechanisms described herein allow a network operator/process to verify either a full or partial connectivity of an MPLS LSP by recording the MPLS label and MIP/LSR ID's along the path of the LSP. Also, the techniques herein determine the path vector in N messages instead of 2*(N−1) messages, as in a traceroute operation. Since these messages proceed outside the forwarding fast path, the CV techniques above may achieve a large reduction (e.g., 50%) of the processing time taken to accomplish a conventional traceroute method.

In addition, with the MPLS deployment in the transport network using static provisioning (where an MPLS signaling control plane is absent), the techniques are beneficial to verify the connectivity of an MPLS LSP. In this statically configured environment, it has generally been assumed that TTL to MIP mappings restrict the options for providing reroute. The techniques herein, however, dynamically rediscover those mapping after a reroute (or switchover) event occurs, thus permitting dynamic reroute/switchover in MPLS networks.

Further, the techniques described herein advantageously provide for a general mechanism to pass OAM messages in an MPLS network using an ACH field in an examined packet. In particular, by determining the MIP to TTL mappings of LSPs, OAM functions may be directed accurately to any MIP/LSR in the network, accordingly.

While there have been shown and described illustrative embodiments that provide for connection verification for MPLS LSPs in a computer network, as well as generally sending OAM function requests, it is to be understood that various other adaptations and modifications may be made within the spirit and scope of the present invention. For example, the embodiments have been shown and described herein directed to use with MPLS LSPs. However, the embodiments of the invention in their broader sense are not so limited, and may, in fact, be used to trace the path of a pseudowire (PW). In the case of a PW, references to the MPLS LSP above may be converted to a PW, such that the PW header carries a TTL value of 1 to force processing at a switching provider edge (SPE) device (equivalent to a MIP). At the same time, however, fields of the packer for use with the underlying MPLS LSP on which the PW is overlaid may contain an LSP TTL value that is set to its "normal" value (e.g., greater than 1) to ensure that delivery to the next PE (SPE or terminating PE, "TPE," equivalent to a MEP) is attempted as normal. Further, while the techniques herein are described in an MPLS-TP context, it is of general applicability to MPLS and multi-segment pseudowires (MS-PWs).

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
receiving a packet at a maintenance intermediate point (MIP) along a multi-protocol label switching (MPLS) label switched path (LSP) that extends from a first maintenance end point (MEP) to a second MEP;
decrementing a time-to-live (TTL) value in a header of the packet;
when the TTL value in the header of the packet equals zero, examining an associated channel header (ACH) field in an operations, administration, and maintenance (OAM) message stored in a payload of the packet;
determining a particular OAM function to perform at the receiving MIP based on an OAM code in the ACH field, wherein the OAM code comprises one of a type code or an operation code, and wherein the OAM message in the payload comprises an ACH field and a second TTL field; and
performing the particular OAM function by the receiving MIP.

2. The method of claim 1, further comprising:
decrementing a payload TTL value in a payload of the packet, the payload TTL value distinct from the TTL value in the header of the packet.

3. The method of claim 2, further comprising:
when the payload TTL value equals a particular value, determining that the receiving MIP is a final destination.

4. The method of claim 2, further comprising:
when to the payload TTL value equals a particular value, preventing further propagation of the packet.

5. The method of claim 1, wherein performing the particular OAM function comprises:
sending a reply along the MPLS LSP toward the first MEP.

6. The method of claim 1, wherein the OAM message is a connection verification (CV) message and the particular OAM function includes a CV operation.

7. The method of claim 6, further comprising:
appending an identification (ID) of the receiving MIP to a route record stored in the payload of the packet; and
forwarding the CV message along the MPLS LSP toward the second MEP in a packet having a reset TTL value in a header.

8. The method of claim 1, wherein the particular OAM function includes taking a performance measurement, entering a loopback mode, or locking the MPLS LSP.

9. The method of claim 1, wherein the TTL value is decremented from a particular value to zero to trigger an expiration of the TTL, wherein the type code comprises a code defining at least one of a connection verification request, a connection verification response, or an acknowledgement, and wherein the payload comprise one or more TLVs (type/length/value objects), the one or more TLVs carrying at least one of a route record TLV, a connection ID TLV, a sequence number TLV, an authentication TLV, a source ID TLV, a target ID TLV, or a response TLV.

10. An apparatus comprising:
one or more network interfaces configured to process packets along a multi-protocol label switching (MPLS) label switched path (LSP) that extends from a first maintenance end point (MEP) to a second MEP;
a processor coupled to the one or more network interfaces and configured to execute one or more processes;
a memory configured to store a maintenance intermediate point (MIP) process executable by the processor, the MIP process when executed operable to:
decrement a time-to-live (TTL) value in a header of a packet received on a network interface of the one or more network interfaces, the packet having a label corresponding to the MPLS LSP, and the TTL value being decrementing from one to zero in order to trigger an expiration of the TTL;
determine that the TTL has expired based on the TTL value of zero;
when the TTL has expired, examine an associated channel header (ACH) field operations, administration, and maintenance (OAM) message stored in a payload of the packet;
determine a particular OAM function to perform at the apparatus based on an OAM code in the ACH field, wherein the OAM code comprises one of a type code or an operation code, and wherein the OAM message in the payload comprises an ACH field and a second TTL field; and
perform the particular OAM function at the apparatus.

11. The apparatus of claim 10, wherein the MIP process when executed is further operable to:
decrement a payload TTL value in a payload of the packet, the payload TTL value distinct from the TTL value in the header of the packet.

12. The apparatus of claim 11, wherein the MIP process when executed is further operable to:
when the payload TTL value equals zero , determine that the apparatus is a final destination of the packet.

13. The apparatus of claim 11, wherein the MIP process when executed is further operable to:
when the payload TTL value equals zero, preventing further propagation of the packet.

14. The apparatus of claim 10, wherein the OAM message is a connection verification (CV) message and the particular OAM function is a CV operation.

15. The apparatus of claim 14, wherein the MIP process when executed is further operable to:
append an identification (ID) of the apparatus to a route record stored in a payload of the packet; and
forward the CV message on a network interface of the one or more network interfaces along the MPLS LSP toward the second MEP in a packet having a reset TTL value in a header of the packet.

16. The apparatus of claim 10, wherein the particular OAM function includes taking a performance measurement, entering a loopback mode, or locking the MPLS LSP.

17. The apparatus of claim 10, wherein the TTL value is decremented from a particular value to zero to trigger an expiration of the TTL, wherein the type code comprises a code defining at least one of a connection verification request, a connection verification response, or an acknowledgement, and wherein the payload comprise one or more TLVs (type/length/value objects), the one or more TLVs carrying at least one of a route record TLV, a connection ID TLV, a sequence number TLV, an authentication TLV, a source ID TLV, a target ID TLV, or a response TLV.

18. A non-transitory computer-readable storage medium having stored therein instructions which, when executed by a processor, cause the processor to perform operations comprising:

receiving a packet at a maintenance intermediate point (MIP) along a multi-protocol label switching (MPLS) label switched path (LSP) that extends from a first maintenance end point (MEP) to a second MEP;

decrementing a time-to-live (TTL) value in a header of the packet;

when the TTL value in the header of the packet equals zero, examining an associated channel header (ACH) field in an operations, administration, and maintenance (OAM) message stored in a payload of the packet in response to the TTL value in the header of the packet equaling a particular value;

determining a particular OAM function to perform at the apparatus based on an OAM code in the ACH field, wherein the OAM code comprises one of a type code or an operation code, and wherein the OAM message in the payload comprises an ACH field and a second TTL field; and performing the particular OAM function at the apparatus.

19. The non-transitory computer-readable storage medium of claim 18, storing additional instruction which, when executed by the processor, result in an operation further comprising:

decrementing a payload TTL value in a payload of the packet, the payload TTL value distinct from the TTL value in the header of the packet.

20. The non-transitory computer-readable storage medium of claim 19, storing additional instruction which, when executed by the processor, result in an operation further comprising:

determining that the apparatus is a final destination of the packet in response to the payload TTL value equaling zero.

\* \* \* \* \*